Jan. 25, 1966  P. ROBINSON  3,231,792
ELECTROLYTIC CAPACITOR
Filed Oct. 18, 1962
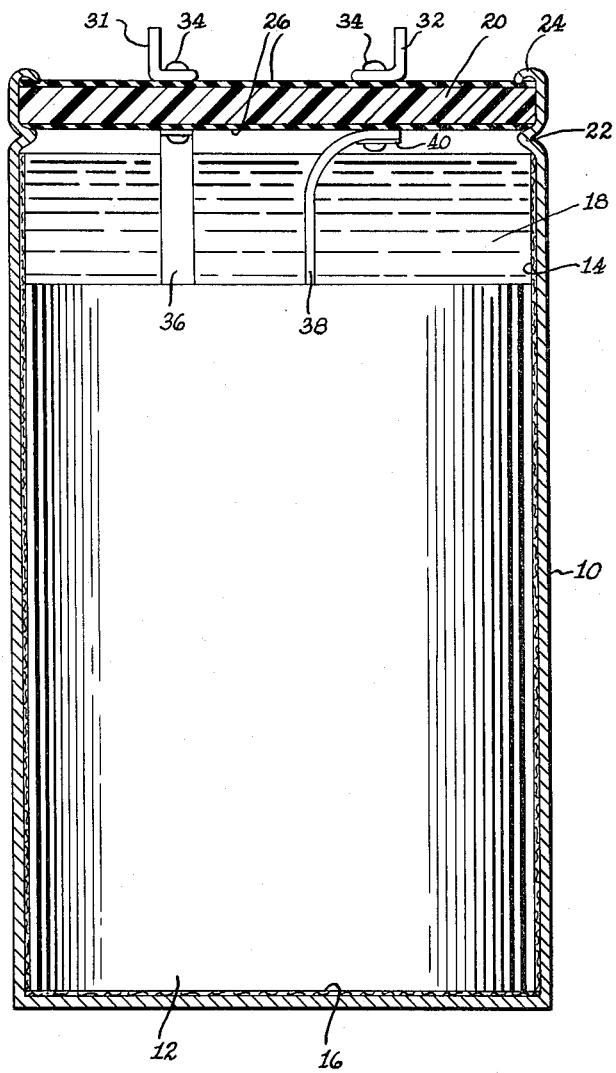
INVENTOR.
PRESTON ROBINSON
BY
HIS ATTORNEYS

United States Patent Office 3,231,792
Patented Jan. 25, 1966

3,231,792
ELECTROLYTIC CAPACITOR
Preston Robinson, Williamstown, Mass., assignor to Sprague Electric Company, North Adams, Mass., a corporation of Massachusetts
Filed Oct. 18, 1962, Ser. No. 233,179
5 Claims. (Cl. 317—230)

This application is a continuation-in-part of S.N. 537,772 which was filed September 30, 1955, and is now abandoned.

This invention relates to electrolytic capacitors, and more particularly to electrolyte systems for producing stable electrolytic capacitors.

The electrolyte in an electrolytic capacitor performs the dual function of being the conducting medium and also maintaining the oxide dielectric film on the anode of the capacitor. In reforming or maintaining the oxide film and in any electrolysis that takes place in the electrolytic capacitor, the electrolyte loses oxygen which results in a loss of water within the system. The optimum water content in electrolytic capacitors is generally considered to be about 2% (range of roughly 1 to 5%) because a lower water content cannot properly reform the dielectric oxide film, and a higher water content does not offer stability in the oxide film. Prior art attempts to maintain a constant water content in electrolyte systems have not been successful over the present-day range of operating temperatures and voltages. As a result, the prior art dielectric oxide films have suffered an instability that results in deterioration of the oxide and ultimately the capacitor.

It is an object of this invention to provide an electrolyte system having a constant water concentration throughout the operating voltage and temperature ranges.

It is another object of this invention to provide an electrolyte system wherein water is present in a constant quantity sufficient to maintain the oxide film and yet not result in hydration of the film.

It is yet another object of this invention to provide an electrolyte system which maintains a stable dielectric oxide film in an electrolytic capacitor.

These and other objects of this invention will be apparent from the following description of several of its exemplifications with reference being made to the accompanying drawing, wherein the single figure is a partial cross-sectional view of an electrolytic capacitor employing the electrolyte system of this invention.

In general, the objects of this invention are attained in an electrolytic capacitor having an electrolyte system which maintains a low constant water concentration by producing water by chemical reaction or by reversal of an equilibrium, e.g. the equilibrium between hydroxy acids and lactones, to offset any reaction that uses water.

More particularly, the objects of this invention are attained in an electrolytic capacitor having an electrolyte system which maintains a chelate on the dielectric oxide film to thereby permit the maintainance of an equilibrium between reactions which use water and those which produce water, thereby providing a low constant concentration of water within the capacitor.

The single figure of the drawing shows an electroyltic capacitor in partial cross-section and is illustrative of the type of capacitor for which the electrolyte system of this invention is particularly directed. Inasmuch as one of the objectives of this invention is to provide an electrolytic capacitor that is operable over wide temperature and voltage ranges, a container of suitable rugged construction is required. In the embodiment of the figure, an open mouthed metal container 10, preferably drawn from a single sheet of metal so that it is of seamless construction, acts as a protective housing encasing the electrolyte 18 as well as the capacitance section 12 of the capacitor. The electrodes of section 12 can be of conventional construction in which the anode is a valve-metal foil, etched if desired to increase its effective surface, and is convolutely wound with another valve-metal foil; non-conductive porous spacers being provided between the two foils to space them from each other in the winding. The anode foil has its surface formed with an in situ developed surface layer of an oxide of the valve-metal which functions as the dielectric of the capacitor.

The convolutely wound electrodes and spacers forming section 12 are inserted in container 10 by way of its open mouth. If desired, insulators such as a tube 14 of paper, for example, and an additional disc 16 of dielectric can be interposed between the section 12 and the walls and floor of container 10 to help insulate the container from the electrodes.

The container 10 is sealed as by a cover disc 20 preferably of relatively rigid and inert material, such as textile fabric that has been impregnated with phenol-formaldehyde or other thermosetting resin. As shown, disc 20 is crimped in place at the mouth of container 10 between an internal rib 22, acting as a seating ledge, and a marginal lip 24, which is spun over against the outer face of disc 20. For improved sealing, the disc 24 can have its surfaces covered with relatively resilient material.

Terminals 31 and 32 for the capacitor are mounted on disc 20 as by means of rivets 34 which penetrate through the disc and also act as conductive connections to the electrode leads which are shown at 36 and 38. Any kind of lead construction can be used, e.g., the anode lead can be in the form of a longitudinally slotted wire in which the anode electrode is clamped, and the other lead can be a tab staked to the appropriate electrode, all as described in U.S. Letters Patent 2,869,052, issued January 13, 1959.

A small amount of freeboard space can be left in the container, as indicated in the drawing, since this reduces electrolyte leakage around the edge of the cover disc. It is desirable in this regard to seal the capacitor while it is held at a temperature corresponding to the maximum intended operating temperature. This will provide a finished product in which the pressure in the container is not apt to exceed atmospheric pressure. When such a construction is subjected to very low temperature, however, the electrolyte will normally undergo much more thermal shrinkage than the container so that the pressure within the container will fall to a very low value. For such use the container itself should be made sufficiently strong to withstand the maximum pressure differential. Where the container is relatively large, it may even be preferable to provide it with a small bellows, which can be conveniently fitted internally, to permit the electrolyte to shrink in volume without changing the internal pressure significantly, The capacitance section 12 a preferred embodiment of this invention is a conventional convolute winding of a pair of electrode foils spaced apart by porous absorbent ribbons. In the case of a polar capacitor, one of the foils is provided with a dielectric oxide coating. By way of example, this invention will be described in terms of an aluminum electrolytic capacitor; hence, one of the aluminum foils of the capacitance section is provided with a dielectric film of aluminum oxide, which is anodically formed at a voltage substantially in excess of the operating voltage of the capacitor. The other aluminum foil is provided with a low voltage formation so as to produce a thin aluminum oxide to enable the capacitor to withstand slight reverse voltages during operation.

According to the present invention, a particularly desirable electrolyte system for electrolytic capacitors is an ionizable solute dissolved at a concentration of from 1 to 40% by weight in a liquid aliphatic hydroxy acid.

Typical acids of this type include alpha-hydroxy butyric acid, beth-hydroxy butyric acid, gamma-hydroxy butyric acid, beta-hydroxy butyric acid, gamma-hydroxy propionic acid, hydroxy acetic acid, 2-methyl-2-hydroxy propionic acid, as well as the isomeric mono-hydroxy monocarboxylic aliphatic acids having up to sixteen carbon atoms per molecule. Such acids can have straight or branched chains of carbon atoms and can also have aromatic or hydroaromatic rings as in alpha hydroxy phenyl acetic acid, 3-hydroxy-3-(beta-pyridino) propionic acid, and alpha hydroxy beta cyclohexyl propionic acid. Many of the above compounds exist as optical or stereoisomers but their operation in electrolytic capacitors appears to be unchanged regardless of which isomeric form is used or whether it is an inactive or racemic compound.

As solute, any ionizable compound such as amine salts of the same hydroxy acids or of stronger acids such as acetic acid, picric acid or o-, m-, or p-dinitro or mononitrophenols, can be used with the above solvents.

Water in the amount of roughly 2% may be added to the electrolytes of this invention. Alternatively, the water may be obtained from the quilibrium between the hydroxy acid and the lactone of the acid plus water. A deliberate addition of a minor amount (about 1%) of lactone ensures maintenance of the equilibrium without decreasing the hydroxy acid content of the system.

The aluminum oxide formed on the aluminum anode enters into an equilibrium reaction with the hydroxy acid plus the water to form aluminum hydroxide. Then the aluminum hydroxide and the hydroxy acid electrolyte system react to produce an aluminum chelate and water. The two reactions are preferably carried out prior to canning the capacitance section. Thus the section has an aluminum electrode that has an aluminum chelate surface on the dielectric aluminum oxide formation. The chelate provides an electrode of greater stability, both under voltage and on shelf, than heretofore known to the art. The water content is maintained constant in this system throughout the operating ranges of temperature and voltage because the reactions that consume water are balanced by reactions that produce water. The condition of the oxide film and the water content are such that anything that affects one affects the other. Therefore the formation of the chelate is of double value by yielding water from the hydrated oxide film and by establishing a stable surface on the oxide film.

In the preferred embodiment of this invention the aluminum electrolytic capacitance section is provided with an aluminum oxide dielectric and is impregnated with a hydroxy acid electrolyte of this invention so as to produce the aluminum hydroxide and consequently the aluminum chelate described above. The capacitance section is then canned as shown in the drawing with additional electrolyte plus water to the desired water concentration and lactone to maintain the lactone plus water in equilibrium with the hydroxy acid.

The electrolyte system of this invention maintains an equilibrium between the aluminum oxide and the water and the hydroxy acid on the one hand, and aluminum hydroxide on the other. However, the aluminum hydroxide reacts with the hydroxy acid to produce a chelate and water. In addition, the hydroxy acid itself tends to esterify to produce a lactone and water. Therefore, the electrolyte system of this invention includes the deliberate addition of lactone to maintain the equilibrium between the hydroxy acid and the lactone plus water. Thus, the electrolyte system maintains the desired low constant water concentration, and maintains a stable aluminum oxide film in which the aluminum oxide is provided with a surface layer of an aluminum chelate.

The following specific examples of the present invention are typical of the way on which it can be applied, all parts being by weight. In each example, 2% water and 1% of the lactone of the particular hydroxy acid were added.

*Example I*

To 95 parts of gamma-hydroxy butyric acid is added five parts of tri-n-butyl amine picrate. The mixture is then impregnated into a convolutely wound pair of electrodes as in the figure, and makes a capacitor that can be used at temperatures of 125° C., or at temperatures substantially below zero degrees C. The anode electrode can be "formed," that is covered, with the situ-formed oxide film by preliminary anodic treatment in an aqueous solution of boric acid having a concentration of about 10%, the forming potential being gradually raised to 375 volts and maintained until the electrolytic current flow is reduced to insignificance. If desired, however, the forming operation can be conducted in the electrolyte used in the final capacitor, either before or after the capacitor is assembled.

*Example II*

99 parts of beta-hydroxy butyric acid are mixed with one part of sodium hydroxide, and then used to impregnate a capacitor winding as in Example I. After forming to 450 volts, the resulting capacitor can be used at temperatures as high as 175° C.

*Example III*

A winding having an aluminum anode formed to 300 volts is impregnated with a mixture of 50 parts alpha-hydroxy propionic acid, 32 parts beta-hydroxy propionic acid, 16 parts of 2-nitrophenol and 2 parts of sodium hydroxide, to make a very effective electrolytic capacitor electrolyte that can be used at temperatures up to 125° C.

*Example IV*

30 parts of glycolic acid, 50 parts of alpha-hydroxy valeric acid and 20 parts of di-ethanol amine picrate make another electrolyte suitable for use at moderately high temperatures, with anodes formed at 225 volts.

*Example V*

49 parts of alpha-hydroxy palmitic acid is mixed with 49 parts of alpha-hydroxy myristic acid and 2 parts of tetra-methyl ammonium hydroxide to make an electrolyte useful at temperatures up to about 175° C.

*Example VI*

82 parts of gamma-hydroxy caproic acid lactone, 12 parts water, and 16 parts of the ammonium salt of 2,4-dinitrophenol are mixed to make another very good electrolytic capacitor electrolyte.

Other suitable ionizable solutes include the following:

Mono-isoamyl amine salt of paranitrophenol
Sodium picramate
Triethyl amine salt of 2,6-di-nitro-4-methyl phenol
Tripropanol amine salt of styphnic acid
Tetraethyl ammonium picrate
Tetramethyl ammonium nitrate
Sodium acetate
Lithium acetate In general, suitable amine salts can either have simple alkyl groups with from 1 to 10 carbon atoms each, or the alkyl groups can be hydroxylated with preferably not more than one hydroxyl each. Although purely inorganic salts such as sodium or calcium nitrate or ammonium borates can also be used, they are generally not as soluble as salts in which the acid or basic constituent is organic. Salts that are relatively neutral, such as those of ammonia or an amine, are preferred since they have less tendency to cause the solvent to undergo changes such as by polymerization.

All the above listed solvents are suitable for separate use in connection with any of the above solutes. Alternatively, the solvents and/or the solutes can be mixed in any desired ratios so long as the overall proportions are as indicated. Some of the hydroxy aliphatic acids have relatively high melting points when pure, and for low temperatures are preferably mixed together, inasmuch as this provides lower melting compositions. Additionally up to about 20% by weight of the electrolyte can be in the form of a relatively inert diluent such as butyronitrile or homologous nitriles, triethyl phosphate or other trialkyl esters of phosphoric acid, dimethyl formamide or even dibutyl orthophthalate. For best results, the electrolyte at operating temperature should have an electrical resistivity of not more than 10,000 ohm-centimeters, although at high temperatures resistivities of 1,000 ohm-centimeters or less can be readily obtained.

The electrolytes of the present invention can be used at operating potentials as low as 1 volt and as high as 450 volts, and at temperatures throughout the capacitor operating range of −55° to +175° C. Normally the anode formation voltage should be at least as high, and preferably 50% higher than the operating voltage. Where the electrolyte is intended to be operated at potentials of 200 volts or higher, the casing in which it is housed should preferably have a venting arrangement, inasmuch as small amounts of inert gas may be given off during such use. Any of the well known types of vents, or even safety releases such as are described in U.S. Letters Patent 2,628,271, granted February 10, 1953, can be used for this purpose.

The electrolytes of the present invention can contain up to about 5% of water without untoward results. More than about 10% of free water is disadvantageous and appears to increase the power factor and reduce the shelf life of the capacitor in which the electrolyte is used, particularly where the capacitor has aluminum electrodes. For extremely low temperatures, however, the moisture content should be kept below 2%. The electrolytes should also be free of those negative ions, such as chlorides, which are small enough in size to penetrate through the dielectric (oxide) film. Such penetration appears to lead to early breakdown.

The electrolyte systems of the present invention are not restricted to use with aluminum anodes, but can also be used with the other known valve-metals, i.e. tantalum, niobium, zirconium, titanium. These electrolyte systems are particularly adapted to use with niobium because of the tendency to form hydrates is counteracted. In addition, they can be used with so-called non-polarized capacitor constructions in which two separately-formed anodes are provided for operation with alternating current. The two anodes can be used as the only electrodes of the capacitor, or an intervening or floating unformed electrodes can also be used with them.

Obviously many modifications and variations of the present invention are possible in the light of the above teachings. It is, therefore, to be understood that within the scope of the appended claims the invention may be practiced otherwise than as specifically described.

What is claimed is:

1. An electrolytic capacitor comprising a valve-metal electrode, a dielectric oxide of said valve-metal on said electrode, and a chelate of said valve-metal on said oxide.

2. An electrolytic capacitor comprising an aluminum electrode, a layer of dielectric aluminum oxide on said electrode, and a layer of aluminum chelate on said oxide.

3. An electrolytic capacitor comprising a pair of spaced electrodes and an electrolyte therebetween, one of said electrodes having a dielectric oxide layer thereon and a chelate surface on said layer, said electrolyte having a constant water content throughout the operating temperature and voltage range.

4. An electrolytic capacitor comprising a pair of spaced electrodes and an electrolyte therebetween, one of said electrodes having a stable dielectric coating of an oxide covered by a chelate, said electrolyte containing a hydroxy acid and additional lactone thereof whereby the water content remains at a low constant value throughout the operating temperature and voltage range of the capacitor.

5. An electrolytic capacitor comprising a pair of spaced electrodes and an electrolyte therebetween, one of said electrodes having a stable dielectric coating of an oxide covered by a chelate, said electrolyte containing an hydroxy acid with additional lactone thereof and water being present to maintain an equilibrium with said hydroxy acid.

References Cited by the Examiner

UNITED STATES PATENTS

| | | | |
|---|---|---|---|
| 2,089,683 | 8/1937 | Clark | 317—230 |
| 2,104,733 | 1/1938 | Brennan | 317—230 |
| 2,165,090 | 7/1939 | Clark | 317—230 |
| 2,165,091 | 7/1939 | Clark | 317—230 |

References Cited by the Applicant

UNITED STATES PATENTS 2,759,132　8/1956　Ross.

JOHN W. HUCKERT, *Primary Examiner.*

DAVID J. GALVIN, *Examiner.*